F. LOTTER.
BEET DIGGER.
APPLICATION FILED NOV. 7, 1910.
999,380.
Patented Aug. 1, 1911.
2 SHEETS—SHEET 1.
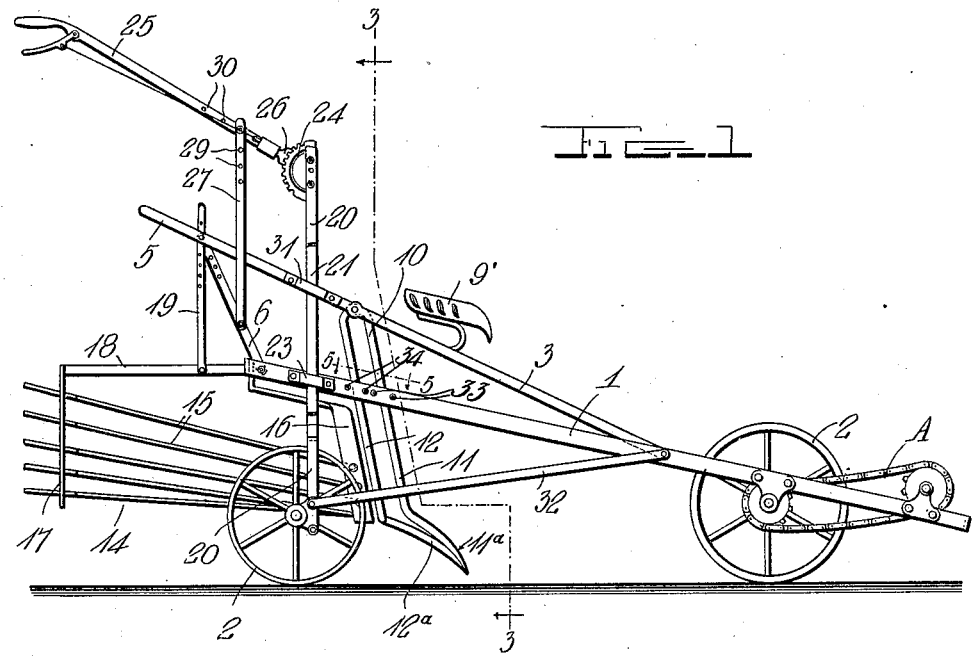
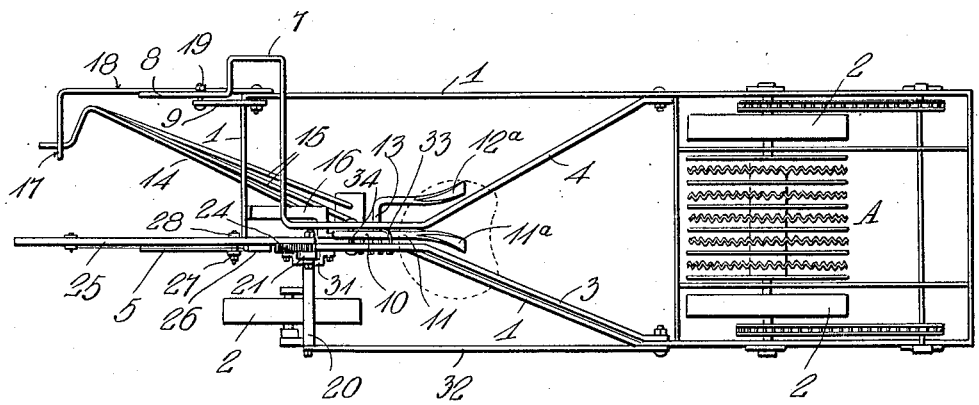
Witnesses
Inventor
F. Lotter
by H. B. Willson & Co.
Attorneys
COLUMBIA PLANOGRAPH CO., WASHINGTON, D. C.

F. LOTTER.
BEET DIGGER.
APPLICATION FILED NOV. 7, 1910.
999,380.
Patented Aug. 1, 1911.
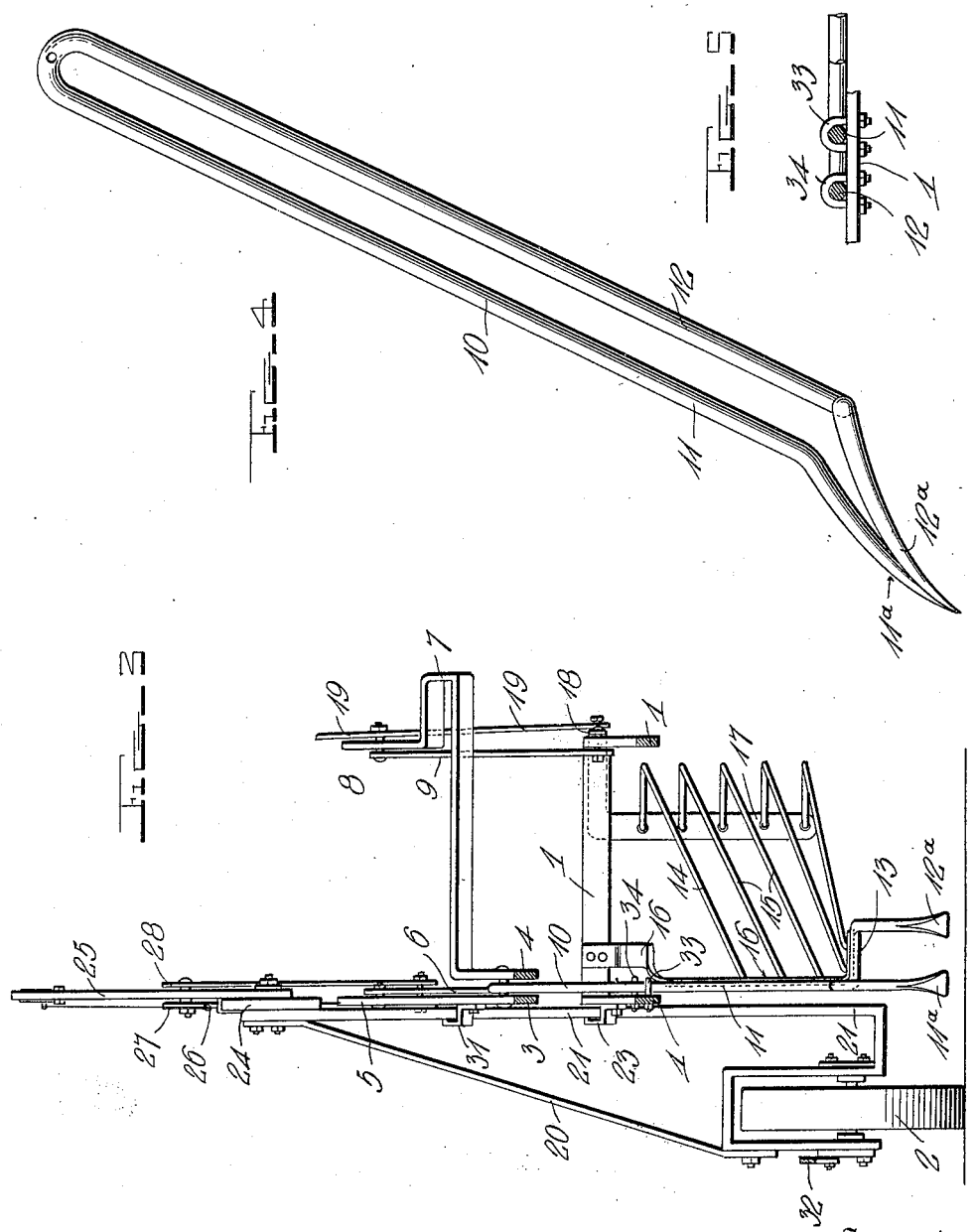
Witnesses
C. Clinton
O. B. Hopkins
Inventor
F. Lotter
by H. B. Willson & Co.
Attorneys

UNITED STATES PATENT OFFICE.

FRANKLIN LOTTER, OF ELKTON, MICHIGAN.

BEET-DIGGER.

999,380. Specification of Letters Patent. Patented Aug. 1, 1911.

Application filed November 7, 1910. Serial No. 591,106.

*To all whom it may concern:*

Be it known that I, FRANKLIN LOTTER, a citizen of the United States, residing at Elkton, in the county of Huron and State of Michigan, have invented certain new and useful Improvements in Beet-Diggers; and I do declare the following to be a full, clear, and exact description of the invention, such as will enable others skilled in the art to which it appertains to make and use the same.

This invention relates to an improved beet lifting or digging machine.

The object of the invention is to provide a simple and efficient beet digger so constructed as to pull very long beets without breaking off any roots and to discharge them in upturned position free of soil.

With this and other objects in view, the invention consists of certain novel features of construction, combination and arrangement of parts as will be more fully described and particularly pointed out in the appended claims.

In the accompanying drawings; Figure 1 is a side elevation of a beet harvester equipped with a digger constructed in accordance with this invention and arranged in operative position; Fig. 2 is a top plan view thereof; Fig. 3 is a vertical transverse section taken on the line 3—3 of Fig. 1, and looking in the direction of the arrow; Fig. 4 is a side elevation of the excavating or digging member detached; Fig. 5 is a detail horizontal section taken on the line 5—5 of Fig. 1.

In the embodiment illustrated, a supporting structure is shown preferably composed of a main frame, 1, mounted on suitable wheels 2, and braced in any desired manner. A topping mechanism A of any desired construction is preferably arranged in the front end of the frame 1, and at the rear thereof is mounted the improved digging or lifting mechanism which constitutes this invention.

Brace bars 3 and 4 are pivotally connected at one end to the opposite side members of the frame 1 and are inclined upwardly and rearwardly converging toward their rear ends and then extending parallel for a short distance. The parallel portions of these bars are spaced laterally a suitable distance to receive the upper end of the lifting or digging member 10 which is secured thereto, and which will be hereinafter described in detail. The bar 3 is extended rearwardly to form a handle 5 which is adjustably connected with the rear end of the frame 1 by a brace 6. The bar 4 is bent to form an outwardly projecting laterally extending U or loop-shaped member 7 having its free leg extended rearwardly parallel with the member 5 to form a handle 8 which is adjustably connected with the main frame 1 by a brace 9 at the side opposite the brace 6. A seat 9' is mounted on said brace bars 3 and 4 adjacent the parallel portions thereof, and may be of any suitable or desired construction. This improved digging or lifting member 10 comprises a substantially inverted U-shaped member preferably composed of round shaft steel, the cross bar of which is secured between the parallel portions of the brace bars 3 and 4, with the legs of said member 10 arranged one in front of the other. The lower ends of the legs 11 and 12 of the member 10 are bent as shown clearly in Fig. 4, to form a beet lifter, closed at its rear and open at one side whereby the beets are forced upwardly and discharged at one side in inverted position, free of soil. The front leg 11 near its lower end is bent forwardly and inclined downwardly to form a prong 11ᵃ with its terminal flared slightly outward and sharpened to readily penetrate the ground. The rear leg 12, which is spaced from the leg 11, is bent laterally at right angles a short distance to form a closure or beet-engaging obstruction 13, and is then extended forwardly and inclined downwardly with its terminal flared slightly to form the other prong 12ᵃ of the digger. The inner end of the prong 11ᵃ is arranged in a plane above the laterally-extending portion 13 of the leg 12, being preferably spaced thereabove two inches, more or less, to provide for the discharge of the beets at one side of the machine, the laterally offset portion 13 at the rear of the prong 12ᵃ serving to prevent the beets from being forced out rearwardly.

A mold board 14 is secured to the frame 1 at the rear of the lifting member 10 and is preferably composed of vertically spaced rods 15, one end of which is secured to a brace 16 depending from the rear of the main frame 1, and the other ends of said rods extend through vertically spaced apertures in a depending arm 17 of a bar 18 which extends longitudinally from one corner of the rear end of the frame 1 and is pivotally connected therewith. This mold board is designed to receive the beets from the member 10 and raise and throw them to one side. The rear ends of the rods 15 are preferably offset as shown to permit the beets to pass off freely therefrom.

A link 19 is connected with the bar 18 and with the handle 8 of the brace bar 4. This link is provided with a plurality of longitudinally spaced apertures to provide for its vertical adjustment to raise or lower the mold board. Two upright members 20 and 21 are secured to the axle of the rear wheel 2 at opposite sides of said wheel and converge toward their upper ends. The inner upright 21 is spaced laterally from the inner side of the rear wheel 2 and passes through a loop 23 formed on the outer face of the adjacent side member of the frame 1, said frame being guided on said bar 21 and adapted to be adjusted vertically by means to be described. A segmental rack 24 is fixed to the upper ends of the bars 20 and 21 and a lever 25 is pivotally mounted at one side of said rack, being provided with the usual spring actuated locking pawl 26. Two links 27 and 28 are connected at one end to opposite sides of the brace bar 6, being adjustably mounted on lever 25 by means of a bolt which is designed to engage one of a series of longitudinally spaced apertures 29 in the links, and one of a series of longitudinally spaced apertures 30 formed in said lever to provide for the engagement of said links therewith at varying points. It will thus be obvious that the lever 25 is operable to raise and lower the rear end of the main frame 1. The upright 21 also passes through a loop 31 secured to the outer face of the brace bar 3 to permit said bar to be moved vertically on said upright. A brace rod 32 is preferably connected at one end to one side member of the frame 1, and at its other end to the lower end of the upright 20.

One side member of the main frame 1 is preferably provided on its inner face with laterally extending longitudinally spaced keepers 33 and 34 through which the legs 11 and 12 of the lifting member pass and by means of which they are reliably held in operative position against spreading.

In the operation of this improved digging apparatus, the topper A at the front of the frame 1 first tops the beets and the prongs 11ª and 12ª of the digger then penetrate the ground adjacent to the topped beet and force it upwardly and rearwardly until it comes in contact with the offset member 13, which prevents its further rearward movement and causes it to pass sidewise on to the mold board 14, from which it is ejected to one side of the machine. This digger, which is constructed in the form shown, of steel shafting, is very strong and there is little danger of the parts becoming broken or twisted.

From the foregoing description, taken in connection with the accompanying drawings, the construction and operation of the invention will be readily understood without requiring a more extended explanation.

Various changes in the form, proportion and the minor details of construction may be resorted to without departing from the principle or sacrificing any of the advantages of the invention as defined in the appended claims.

I claim as my invention:

1. A beet digger comprising a supporting structure, and an inverted U-shaped member mounted therein in upright position with the legs thereof arranged one in front of the other and in longitudinal alinement and with downwardly and forwardly inclined prongs at its lower end.

2. A beet digger comprising a wheeled supporting structure, a digging element mounted in said structure and comprising longitudinally spaced uprights depending from said frame and arranged one in front of the other in longitudinal alinement, forwardly and downwardly inclined prongs arranged at the lower ends of said uprights, one of said prongs being arranged in a plane above the other at its point of connection with said upright, and means for obstructing the rearward movement of the excavated beets.

3. A beet digger comprising a wheeled supporting structure, longitudinally spaced uprights mounted in said structure and one in front of the other in longitudinal alinement, a prong extending downwardly and forwardly from the lower end of the front upright, a similar prong connected with the lower end of the rear upright and offset laterally therefrom, said laterally offset portion being arranged in a plane below the rear end of said first mentioned prong.

4. In a beet digger a wheeled supporting structure, an inverted U-shaped member secured at its cross bar thereto and depending therebelow with the legs thereof arranged one in front of the other, downwardly and forwardly inclined prongs secured to the free ends of said legs, one of said prongs being offset laterally from the other and with its rear end arranged in a plane below the rear of the other prong.

5. A beet digger comprising a wheeled supporting structure, a digging element depending therefrom, means for adjusting said element vertically, and a vertically adjustable mold board arranged at the rear of said digging element.

6. A rectangular main frame, supporting wheels therefor, uprights extending from the rear supporting wheel, a loop on said main frame slidably engaged with one of said uprights, a lever fulcrumed on said upright, a link adjustably connected with said lever and with said frame, a digging element secured to said frame, and a mold board adjustably mounted at the rear of said digging element and composed of vertically spaced rods having their outer ends offset.

In testimony whereof I have hereunto set my hand in presence of two subscribing witnesses.

FRANKLIN LOTTER.

Witnesses:
  WILLIAM L. DOYLE,
  F. E. DOYLE.